US006122992A

United States Patent [19]

Papandreou

[11] Patent Number: 6,122,992

[45] **Date of Patent: *Sep. 26, 2000**

[54] STEERING WHEEL AND AIR BAG ASSEMBLY ATTACHMENT TO A STEERING SHAFT

[75] Inventor: John P. Papandreou, Medford, N.Y.

[73] Assignee: TRW Inc., Lyndhurst, Ohio

[ * ] Notice: This patent is subject to a terminal disclaimer.

[21] Appl. No.: 08/949,569

[22] Filed: Oct. 14, 1997

Related U.S. Application Data

[60] Provisional application No. 60/029,498, Oct. 29, 1996.

[51] Int. Cl.[7] .................................................... B60R 21/16

[52] U.S. Cl. ....................... 74/552; 280/728.1; 280/728.2

[58] Field of Search ........................... 74/552; 280/728.1, 280/728.2, 731–734; 403/320, 351, 374

[56] References Cited

U.S. PATENT DOCUMENTS

| | | | |
|---|---|---|---|
| 4,877,264 | 10/1989 | Cuevas | 280/731 |
| 5,144,861 | 9/1992 | Nishijima et al. . | |
| 5,431,438 | 7/1995 | Manabe . | |
| 5,470,099 | 11/1995 | Williams . | |
| 5,553,888 | 9/1996 | Turner et al. . | |
| 5,570,901 | 11/1996 | Fyrainer . | |
| 5,584,501 | 12/1996 | Walters . | |
| 5,584,503 | 12/1996 | Lutz . | |
| 5,588,337 | 12/1996 | Milton | 403/320 X |
| 5,615,910 | 4/1997 | Margetak et al. . | |
| 5,692,769 | 12/1997 | Scharboneau et al. . | |
| 5,692,770 | 12/1997 | Scharboneau et al. . | |
| 5,749,598 | 5/1998 | Exner et al. . | |

FOREIGN PATENT DOCUMENTS

| | | |
|---|---|---|
| 0728652 | 8/1996 | European Pat. Off. . |

OTHER PUBLICATIONS

GMI Engineering and Management Institute Senior Thesis Project, "Design of a One–Piece Steering Wheel/Airbag Cover," by Mark Scharboneau dated May 28, 1993.

*Primary Examiner*—Vinh T. Luong
*Attorney, Agent, or Firm*—Tarolli, Sundheim, Covell, Tummino & Szabo LLP

[57] ABSTRACT

An apparatus includes an assembly to be mounted on a vehicle steering shaft which rotates about an axis to steer the vehicle and which has a threaded end portion. The assembly includes a steering wheel armature (10), a hub (34) fixedly connected to the steering wheel armature (10) and for non-rotatable attachment to the steering shaft, an inflatable vehicle occupant restraint (50), an inflator (15) for providing inflation fluid for inflating the vehicle occupant restraint (50), a frame (24) supporting the vehicle occupant restraint (50), and the inflator (15) on the steering wheel armature (10), and a cover (35) covering the steering wheel armature (10), the vehicle occupant restraint (50), and the inflator (15). A rotatable fastener (30) axially forces the assembly onto the steering shaft with the hub (34) non-rotatably attached to the steering shaft. The fastener (30) has an attachment portion (33) for threaded engagement with the threaded end portion of the steering shaft. The assembly has a surface (34*a*) for supporting the fastener (30) the assembly for rotation relative to the assembly. The fastener (30) includes a driven gear portion (32) fixed to the attachment portion (33) and for rotating the fastener in one direction relative to the assembly about the axis of the steering shaft to effect the axial forcing. A driving gear (40) forms a part of the assembly and is in meshing engagement with the gear portion (32) of the fastener (30).

12 Claims, 4 Drawing Sheets

22
21
23
23
15
15a
17
16
17
8
10a
11
18
18a
12
48
11
10
14
13
30a
41
40
44
44
30
31
27
32
26a
25
26a
27
24
26b
26b
26a
26a
26b
27
27
28
27
28a
33
29
28b
34

8
11
39
38
34
33
29
21
36
37
12
24
11

STEERING WHEEL AND AIR BAG ASSEMBLY ATTACHMENT TO A STEERING SHAFT

RELATED APPLICATION

This application claims priority from U.S. provisional patent application Ser. No. 60/029,498, filed Oct. 29, 1996, entitled "Means for Attaching a Pre-assembled or Integral Steering Wheel Assembly onto the Steering Column Shaft Using Conventional Coupling Means".

FIELD OF THE INVENTION

The present invention relates to the attachment of a steering wheel and air bag assembly to a steering shaft of a vehicle. More particularly, the present invention relates to the attachment of a steering wheel and air bag assembly to a steering shaft of a vehicle that permits the entire assembly to be assembled prior to attachment to the steering shaft.

BACKGROUND OF THE INVENTION

A typical assembly process for a vehicle steering wheel having a driver's side air bag involves a series of sequential steps. For example, a steering wheel is first attached to a steering shaft using a fastener which is accessed and tightened in a center area of the steering wheel. Next, an air bag module is placed in the center area of the steering wheel and secured thereto.

SUMMARY OF THE INVENTION

The present invention is an apparatus comprising an assembly to be mounted on a vehicle steering shaft which rotates about an axis to steer the vehicle and which has a threaded end portion. The assembly comprises a steering wheel armature, a hub fixedly connected to the steering wheel armature and for non-rotatable attachment to the steering shaft, an inflatable vehicle occupant restraint, an inflator for providing inflation fluid for inflating the vehicle occupant restraint, support means supporting the vehicle occupant restraint and the inflator on the steering wheel armature, and cover means covering the steering wheel armature, the vehicle occupant restraint, and the inflator. A rotatable fastener axially forces the assembly onto the steering shaft with the hub non-rotatably attached to the steering shaft. The fastener has an attachment portion for threaded engagement with the threaded end portion of the steering shaft.

The assembly has means supporting the fastener on the assembly for rotation relative to the assembly. The fastener includes a driven gear portion fixed to the attachment portion and for rotating the fastener in one direction relative to the assembly about the axis of the steering shaft to effect the axial forcing. A driving gear forms a part of the assembly and is in meshing engagement with the gear portion of the fastener.

BRIEF DESCRIPTION OF THE DRAWINGS

Further features of the present invention will become more apparent from the ensuing description when considered together with the accompanying drawing where.

DESCRIPTION OF A PREFERRED EMBODIMENT

Figure 1:
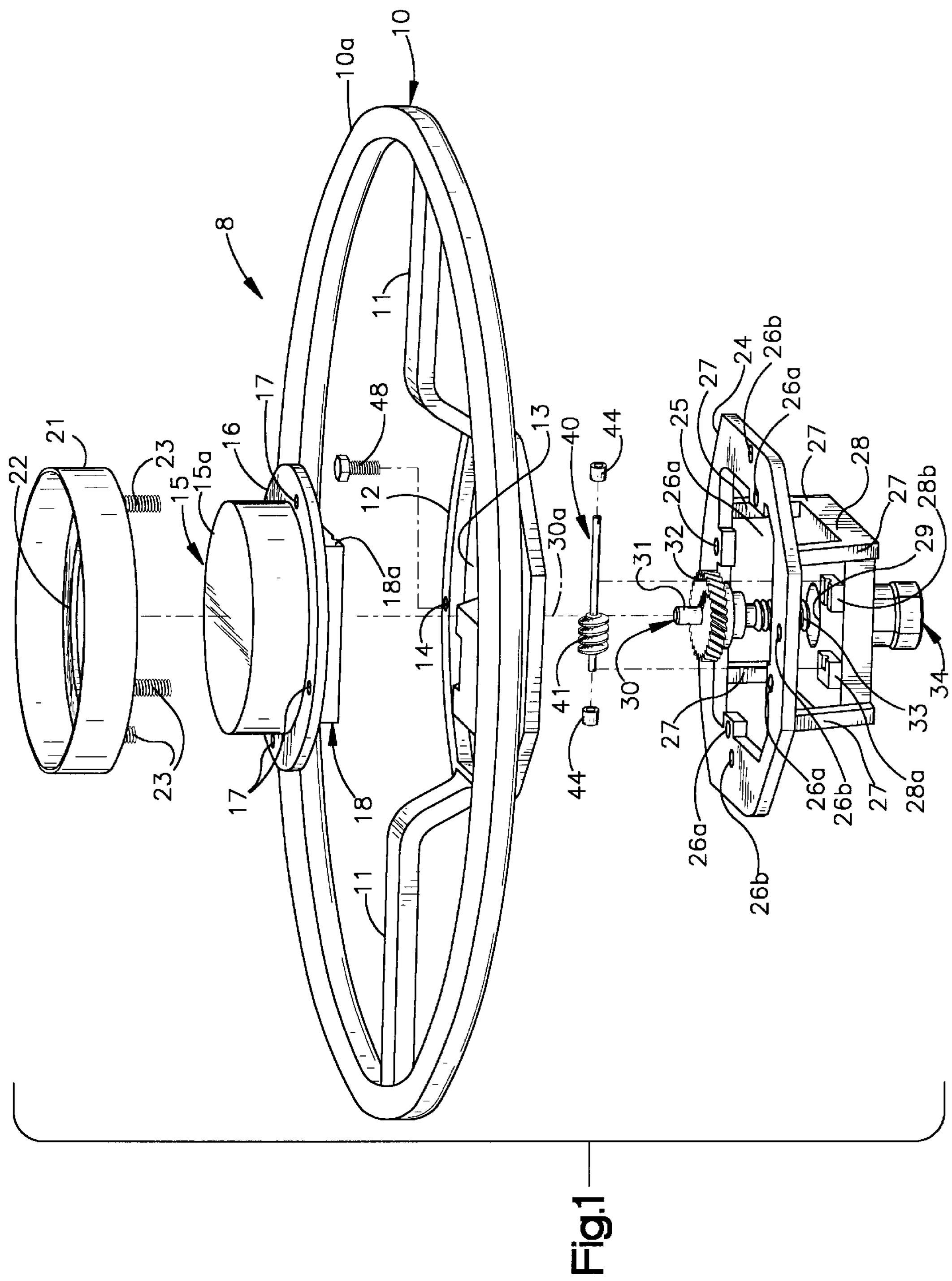
FIG. 1 is an exploded perspective view showing a vehicle steering wheel and air bag assembly according to the present invention.
Figure 2:
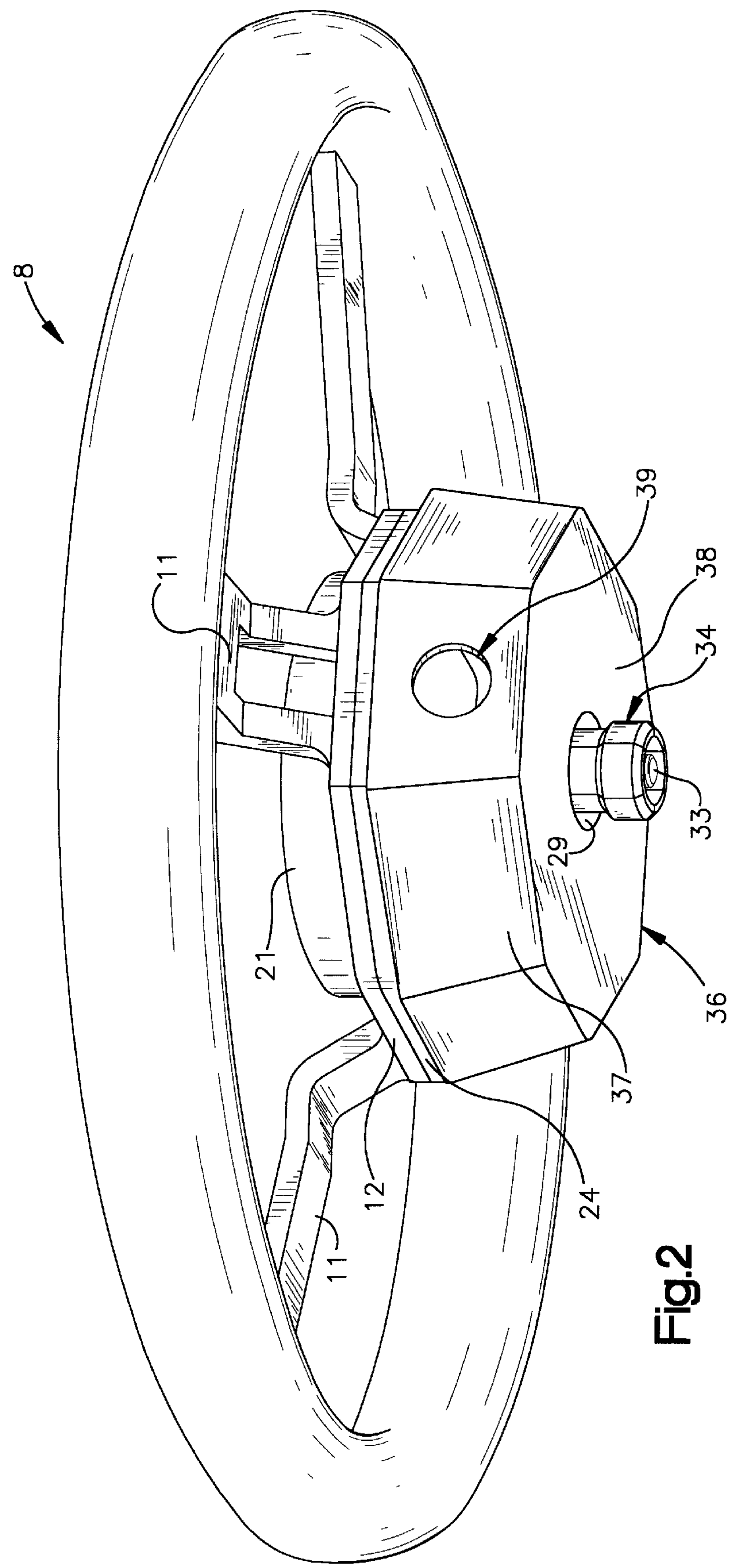
FIG. 2 is a perspective view of FIG. 1 illustrating further parts of the present invention.

With reference to the various figures wherein like reference numerals identify like parts, FIG. 1 illustrates a steering wheel and air bag assembly 8 according to the present invention which includes a die cast steering wheel armature 10 having a rim 10*a*, a plurality of inwardly disposed radial arms (or spokes) 11, and an upper frame 12. The upper frame 12 is fixedly connected to the rim 10*a* by the spokes 11. The upper frame 12 has a central opening 13 defined therein and is provided with a plurality of spaced apertures 14 about its periphery for receiving a plurality of fasteners 48.

Figures 4, 5, 6:
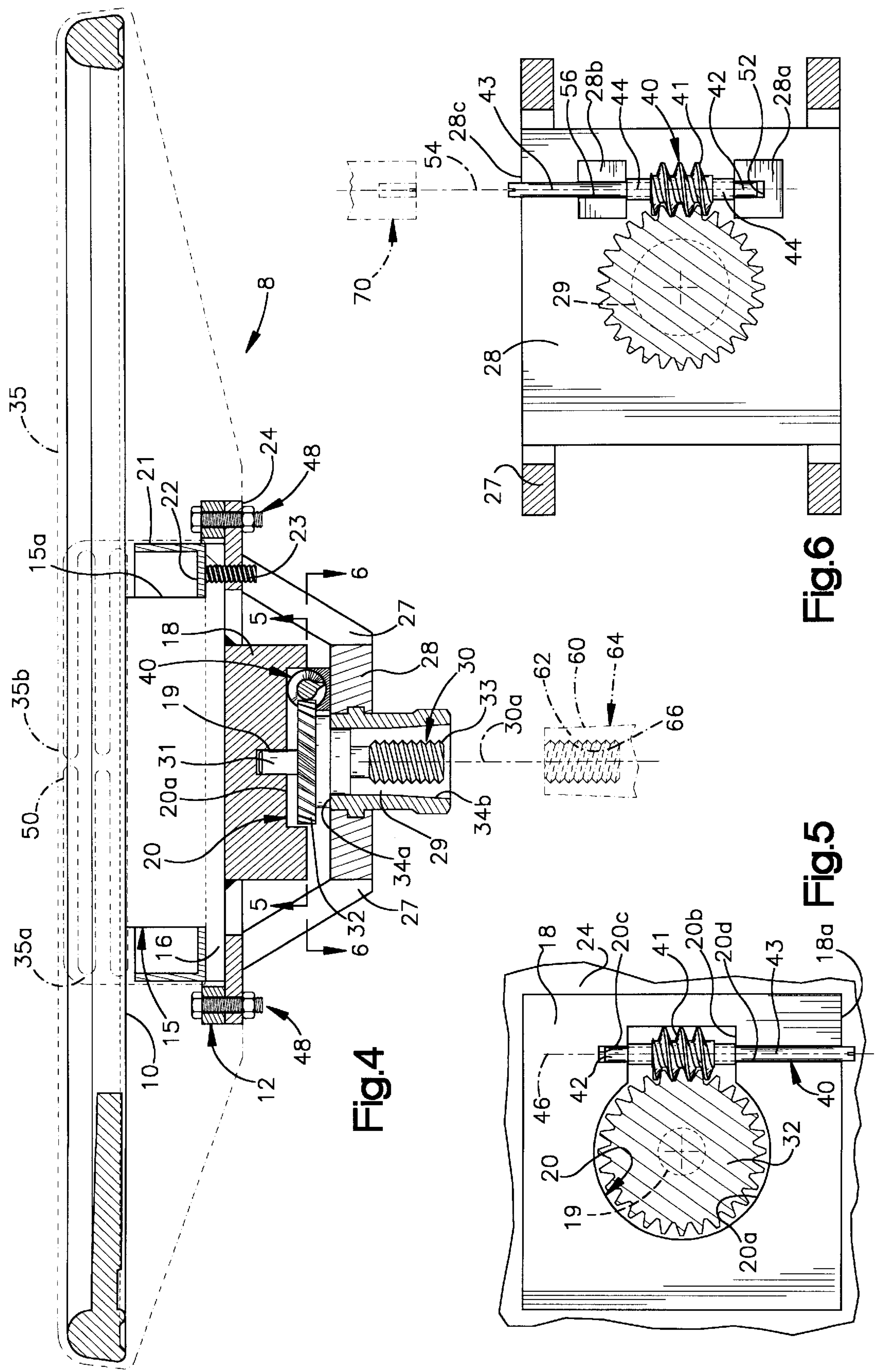
FIG. 4 is a partial sectional view of the steering wheel and air bag assembly shown in FIG. 2.
FIG. 5 is a view taken along line 5—5 in FIG. 4.
FIG. 6 is a view taken along line 6—6 in FIG. 4.

An air bag inflator 15 (FIG. 1) provides inflation fluid to inflate an inflatable vehicle occupant restraint or air bag 50 (shown schematically in FIG. 4). The inflator 15 has a cylindrical housing 15*a*. The bottom of the inflator housing 15*a* has an outwardly extending flange 16 with a plurality of circumferentially spaced apertures 17 formed therein.

Figure 3:
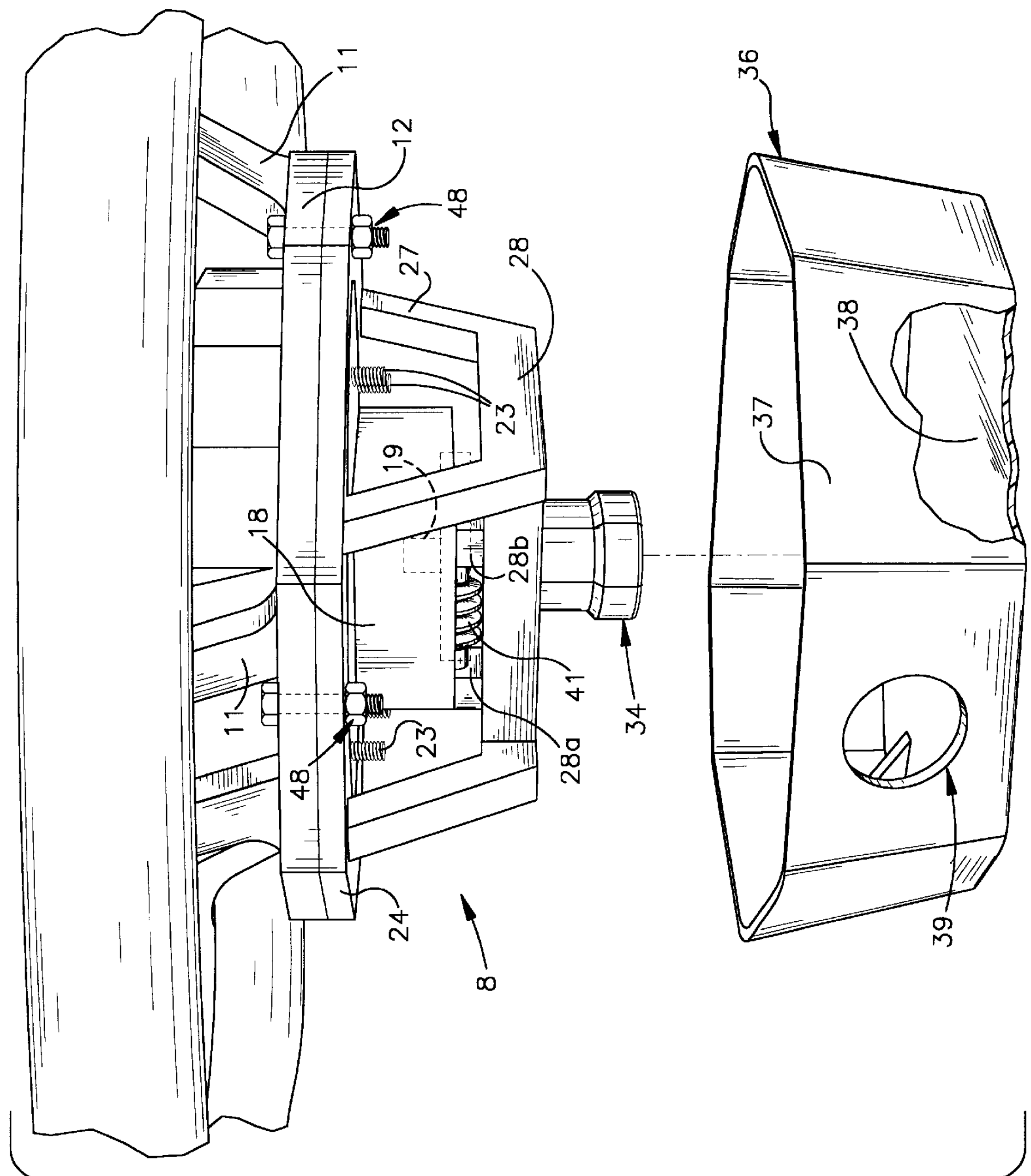
FIG. 3 is an exploded perspective view of a portion of FIG. 2.

A centrally positioned guide portion 18 extends downward from the inflator housing 15*a*. The guide portion 18 may be formed integrally with the housing 15*a* or as a separate part which is fastened or welded (as shown) to the housing. The guide portion 18 has a centrally located axially extending bore 19 (FIGS. 3 and 4). The guide portion 18 includes a generally circular recess 20 which extends upward from the bottom surface of the guide portion and extends transverse to the axial bore (FIG. 5).

The recess 20 has a first portion 20*a*, a second portion 20*b*, a third portion 20*c*, and a fourth portion 20*d*. The first portion 20*a* of the recess 20 intersects the axial bore 19 as may be seen in FIG. 4. The second recess portion 20*b* is a rectangular-shaped branch of the first recess portion 20*a*. The third and fourth recess portions 20*c* and 20*d* are semi-cylindrical in shape and extend from opposite ends of the second recess portion 20*b* along a common axis 46. The fourth portion 20*d* of the recess 20 extends through a side 18*a* of the guide portion 18.

An air bag retainer 21 secures the air bag 50 to the inflator housing 15*a*. The retainer 21 has an inwardly extending, circumferential flange 22 at its lower end and a plurality of downwardly extending, circumferentially spaced studs 23 which are positioned to be received through openings (not shown) in the air bag 50 and then also through the apertures 17 in the flange 16 of the inflator housing 15*a*. The air bag 50 is thus retained by being clamped between the inflator flange 16 and the retainer flange 22, with the retainer 21 being disposed inside the air bag.

An integral cover 35, shown schematically in FIG. 4, is molded about the steering wheel armature 10. In particular, the cover 35 covers the rim 10*a*, spokes 11 and the perimeter of the upper frame 12. The cover 35 defines a chamber 35*a* in which the air bag 50 and the inflator 15 are located. The cover 35 has an upper continuous surface 35*b* which extends uninterruptedly over the air bag 50, the inflator 15, and the steering wheel armature 10. Thus, the cover 35 covers the inflator 15 and the air bag 50 as well as the armature 10. In accordance with the preferred embodiment of the invention, the cover 35 is made of a urethane material. It is contemplated that the cover 35 could be made from several cover portions rather than the integral cover shown. For example, an alternate cover could include a first cover portion covering the steering wheel rim 10*a* and a second cover portion covering the air bag 50.

The steering wheel and air bag assembly 8 includes a lower frame 24 having a central opening 25 defined therein and a plurality of spaced apertures 26*a* formed about its periphery for receiving the studs 23 therethrough. The lower frame 24 also has a plurality of spaced apertures 26*b* for receiving the fasteners 48 to connect the lower frame to the upper frame 12. The lower frame 24 further includes a plurality of depending legs 27 which support a generally rectangular sub-frame 28.

The sub-frame 28 includes first and second upwardly extending bearing portions 28*a* and 28*b*, respectively (FIG. 6). The bearing portions 28*a*, 28*b* are spaced apart and are colinearly located along a line which is offset from the center of the sub-frame 28. The bearing portions 28*a*, 28*b* are spaced apart by a distance approximately equal to the length of the second recess portion 20*b* in the guide portion 18. The first bearing portion 28*a* has a transversely extending semi-cylindrical recess 52 which is centered on an axis 54 and which is identical in size and shape to the third recess portion 20*c* in the guide portion 18. The second bearing portion 28*b* has a transversely extending semi-cylindrical passage 56 which is centered on the axis 54. The passage 56 is identical in size and shape to the fourth recess portion 20*b* in the guide portion 18 and extends through a side 28*c* of the bearing portion 28*b*.

A tubular-shaped hub 34 is fixedly connected to the sub-frame 28 and includes a central passage 29 to receive a portion of a rotatable fastener 30 described below. The hub 34 includes an upper surface 34*a* which extends radially from the central passage 29. An inner surface 34*b* of the hub 34 is partially tapered, as may be seen in FIG. 4, for receiving a tapered outer surface 60 on one end 62 of a vehicle steering shaft 64.

The rotatable fastener 30 (FIG. 4) comprises a first end portion 31, a worm wheel gear portion 32, and a second end portion 33. The worm wheel gear portion 32 is intermediate the first and second end portions 31, 33. The first end portion 31, the worm wheel gear portion 32, and the threaded second end portion 33 of the fastener 30 are fixed together and rotate together. Preferably, the fastener 30 is made from one piece of a metallic material.

The second end portion 33 of the fastener 30 is externally threaded and screws into an internally threaded opening 66 in the tapered end 62 of the steering shaft 64. The fastener 30 is rotatable about its axis 30*a* which is coaxial with the axis of rotation of the vehicle steering shaft 64.

The fastener 30 rests on and is supported for rotation by the upper surface 34*a* of the hub 34. The first end portion 31 of the fastener 30 is located and rotatable in the axial bore 19 in the guide portion 18. The second end portion 33 of the fastener 30 extends into the passage 29 in the hub 34, and terminates approximately in the plane in which the hub 34 terminates.

A driving gear 40 for driving the fastener 30 is supported for rotation by the bearing portions 28*a*, 28*b* in the lower frame 24 (FIGS. 5 and 6). The driving gear 40 comprises a worm gear portion 41, a pin portion 42 and a shaft portion 43. The worm gear portion 41 is located between one end of the shaft portion 43 and the pin portion 42. The worm gear portion 41 and the pin portion 42 are fixed for rotation with the shaft portion 43. The pin portion 42 extends into and is supported for rotation in the recess 52 in the bearing portion 28*a*. The shaft portion 43 extends through and is supported for rotation in the passage 56 in the bearing portion 28*b*. The shaft portion 43 extends beyond the side 28*c* of the rotor mount 28*b* so that the shaft portion can be gripped by a conventional rotating device (not shown) to rotate the shaft portion and, thus, the worm gear portion 41 of the driving gear 40. A pair of spacers 44 are disposed on the shaft portion 43 and are located on either side of the worm gear portion 41 for spacing the worm gear portion from inwardly facing surfaces of the bearing portions 28*a*, 28*b*.

A lower cover 36 which covers the lower frame 24 is illustrated in FIG. 3. The lower cover 36 can be constructed to have a single, circular side wall or a plurality of contiguous, angularly joined panels forming the side wall 37 and a bottom wall 38. An opening 39 in the side wall 37 serves as an access means to facilitate entry within the lower cover 36 to engage the shaft portion 43 of the driving gear 40 without the need to remove the lower cover 36. An aperture (not shown) is provided in the center of the bottom wall 38 to accommodate the extension of the hub 34 therethrough.

The assembly of the aforementioned parts includes locating the fastener 30 on the upper surface 34*a* of the hub 34 and meshing the worm wheel gear portion 32 of the fastener with the worm gear portion 41 of the driving gear 40 which is supported by the bearing portions 28*a*, 28*b*. Next, studs 23 are positioned through the apertures (not shown) in the air bag 50, through the apertures 17 in the inflator flange 16, and through the apertures 26*a* in the lower frame 24 while guiding the first end portion 31 of the fastener 30 into the axial bore 19 in the guide portion 18. At the same time, the worm wheel gear portion 32 of the fastener 30 is received in the first recess portion 20*a* and the worm gear portion 41 of the driving gear 40 is received in the second recess portion 20*b*. Further, the pin portion 42 of the driving gear 40 is received in the third recess portion 20*c* in the guide portion 18 and the shaft portion 43 of the driving gear is received in the fourth recess portion 20*d*. At this point in the assembly, the axes 46 and 54 are coincident. The guide portion 18 and the transverse recess 20 thus form a portion of an enclosure enclosing the driving gear 40 and helping to support the driving gear for rotation relative to the guide portion and the bearing portions 28*a*, 28*b*. Nuts (not shown) are then threaded onto the ends of the studs 23 to secure the retainer 21, the air bag 50 and the inflator 15 to the lower frame 24.

The upper frame 12 of the steering wheel armature 10 is attached to the lower frame 24 by the fasteners 48 which extend through the apertures 14 in the upper frame 12 and the apertures 26*b* in the lower frame 24. Next, the bottom cover 36 is secured by fasteners (not shown) to the lower frame 24 so that the hub 34 extends beyond the planar surface of the bottom wall 38 of the bottom cover 36 and the access port 39 in the side wall 37 of the bottom cover 36 is approximately aligned with the shaft portion 43 of the driving gear 40. The steering wheel and air bag assembly 8 is then complete and is thus ready to be secured to the steering shaft 64.

The steering wheel and air bag assembly is secured to the steering shaft by first locating the hub 34 coaxial with the steering shaft. When so located, the threaded second end portion 33 of the fastener 30 is aligned with the internally threaded opening 66 in the end 62 of the steering shaft 64. The shaft portion 43 of the driving gear 40 is then grasped by a chuck 70 or the like on the end of the conventional rotating device which has been inserted through the access opening 39 in the cover 36. As the rotating device is rotated in a tightening direction, the shaft portion 43, the worm gear portion 41, and the pin portion 42 of the driving gear 40 are rotated by the chuck 70 in the tightening direction.

Rotation of the worm gear portion 41 of the driving gear 40 causes the fastener 30, due to the meshed engagement of the gear portions 32 and 41, to rotate in the tightening direction and to become screwed into the internally threaded opening 66 in the end 62 of the vehicle steering shaft 64. The rotation of the fastener 30 in the tightening direction moves the fastener axially toward the steering shaft 64, thereby forcing the steering wheel and air bag assembly 8 downward relative to the steering shaft as viewed in FIG. 4. As the steering wheel assembly 8 is forced downward relative to the steering shaft 64, the tapered surfaces 34*b* and 60 on the hub 34 and on the steering shaft 64 respectfully are pressed together to secure the steering wheel and air bag assembly to the steering shaft. In addition, complimentary flats (not shown) on the hub 34 and on the steering shaft 64 provide an alignment of the steering wheel and air bag assembly 8 on the steering shaft as well as a means for transmitting torque from the steering wheel and air bag assembly to the steering shaft.

Torque which is produced by turning the steering wheel rim 10*a* (i.e., steering the vehicle) is transmitted through the spokes 11 to the interconnected upper and lower frames 12 and 24, to the hub 34 which is fixed to the lower frame 24, and from the hub 34 to the steering shaft 64.

The description above relates to attaching the steering wheel and air bag assembly 8 to the steering shaft 64 of a vehicle by rotation of the fastener 30 in a tightening direction. After the steering wheel and air bag assembly 8 is secured to the steering shaft 64 by the fastener 30, it can be removed from the steering shaft by rotation of the fastener 30 in an untightening direction opposite the tightening direction of rotation. Rotation in the untightening direction causes the fastener 30 to move axially and relatively away from the steering shaft 64. The top end of the first end portion 31 of the fastener 30 will abut against a facing surface of the axial bore 19 in the guide portion 18. This will apply an upward force on the steering wheel and air bag assembly 8 and, particularly the hub 34, causing disengagement of the hub 34 and the steering shaft 64 and permitting removal of the steering wheel and air bag assembly from the steering shaft.

Although the invention has been described with particularity and in some detail, it will be appreciated by those skilled in the art that changes and modifications can be made therein without departing from the scope and spirit of the claimed invention.

Having described the invention, the following is claimed:

1. An apparatus for mounting on a vehicle steering shaft which rotates about an axis to steer a vehicle, the steering shaft having a threaded end portion, said apparatus comprising:

an assembly comprising:

a steering wheel armature including a rim, an upper frame, and a plurality of spokes connecting said rim to said upper frame;

a hub connected to the steering wheel armature and for non-rotatable attachment to the steering shaft;

an inflatable vehicle occupant restraint;

an inflator for providing inflation fluid for inflating said vehicle occupant restraint, said inflator and said vehicle occupant restraint being supported by said upper frame of said steering wheel armature; and cover means for covering said steering wheel armature, the vehicle occupant restraint, and said inflator;

a rotatable fastener for axially forcing said assembly onto the steering shaft with said hub non-rotatably attached to the steering shaft, said fastener having an attachment portion for threaded engagement with the threaded end portion of the steering shaft;

said assembly having surface means for supporting said fastener on said assembly for rotation relative to said assembly;

said fastener including a driven gear portion fixed to said attachment portion and for rotating said fastener in one direction relative to said assembly about the axis of the steering shaft to effect said axial forcing; and a driving gear forming a part of said assembly, said driving gear being in meshing engagement with said gear portion of said fastener;

said hub being fixedly attached to a lower frame, of said steering wheel armature, said driving gear being rotatably mounted to said lower frame;

said gear portion of said fastener comprising a worm wheel gear, said driving gear including a worm gear portion meshing with said worm wheel gear and a shaft portion which is driveable to rotate said worm gear portion;

said inflator having a housing and a guide portion extending downwardly from said housing, said guide portion having an axial bore for receiving a portion of said rotatable fastener and a transverse recess for receiving a portion of said driving gear.

2. An apparatus as set forth in claim 1 wherein said driving gear is supported for rotation by a pair of spaced apart bearing portions which extend from said lower frame.

3. An apparatus as set forth in claim 1 wherein said assembly includes a lower cover for covering said lower frame, said lower cover having an access opening for receiving a device for driving said driving gear and thereby rotating said fastener.

4. An apparatus as set forth in claim 1 wherein said cover means for covering said steering wheel armature, said vehicle occupant restraint and said inflator comprises an integral cover.

5. An apparatus as set forth in claim 4 wherein said integral cover comprises a urethane material having a continuous outer surface extending uninterrupted over said steering wheel armature, said vehicle occupant restraint and said inflator.

6. An apparatus for mounting on a vehicle steering shaft which rotates about an axis to steer a vehicle, the steering shaft having a threaded end portion, said apparatus comprising:

an assembly comprising:

a steering wheel armature including a rim, an upper frame, and a plurality of spokes connecting said rim to said upper frame;

a hub connected to the steering wheel armature and for non-rotatable attachment to the steering shaft;

an inflatable vehicle occupant restraint;

an inflator for providing inflation fluid for inflating said vehicle occupant restraint, said inflator having a housing and a guide portion extending downwardly from said housing toward said hub;

said inflator and said vehicle occupant restraint being supported by said upper frame of said steering wheel armature; and cover means for covering said steering wheel armature, the vehicle occupant restraint, and said inflator;

a rotatable fastener for axially forcing said assembly onto the steering shaft with said hub non-rotatably attached to the steering shaft, said fastener having an attachment portion for threaded engagement with the threaded end portion of the steering shaft;

said assembly having surface means for supporting said fastener on said assembly for rotation relative to said assembly;

said fastener including a driven gear portion fixed to said attachment portion and for rotating said fastener in one direction relative to said assembly about the axis of the steering shaft to effect said axial forcing; and a driving gear forming a part of said assembly, said driving gear being in meshing engagement with said gear portion of said fastener;

said guide portion of said inflator having an axial bore for receiving a portion of said rotatable fastener and a transverse recess for receiving a portion of said driving gear.

7. An apparatus as set forth in claim 6 wherein said hub is fixedly attached to a lower frame of said steering wheel armature, said driving gear being rotatably mounted to said lower frame.

8. An apparatus as set forth in claim 6 wherein said driving gear is supported for rotation by a pair of spaced apart bearing portions which extend from said lower frame.

9. An apparatus as set forth in claim 6 wherein said gear portion of said fastener comprises a worm wheel gear, said driving gear including a worm gear portion meshing with said worm wheel gear and a shaft portion which is driveable to rotate said worm gear portion.

10. An apparatus as set forth in claim 6 wherein said assembly further includes a lower frame connecting said hub to said upper frame and a lower cover covering said lower frame, said lower cover having a side wall with an access opening for receiving a device for driving said driving gear and thereby rotating said fastener.

11. An apparatus as set forth in claim 6 wherein said cover means for covering said steering wheel armature, said vehicle occupant restraint and said inflator comprises an integral cover.

12. An apparatus as set forth in claim 11 wherein said integral cover comprises a urethane material having a continuous outer surface extending uninterrupted over said steering wheel armature, said vehicle occupant restraint and said inflator.

* * * * *